May 5, 1959

A. J. KIZAUR 2,885,557

INSPECTION APPARATUS

Filed April 1, 1955

SCANNING ZONES

INVENTOR:—
ARTHUR J. KIZAUR
BY:—
Junius F. Cook, Jr.
ATTORNEY

United States Patent Office 2,885,557
Patented May 5, 1959

2,885,557

INSPECTION APPARATUS

Arthur J. Kizaur, Pewaukee, Wis., assignor to General Electric Company, a corporation of New York Application April 1, 1955, Serial No. 498,561

8 Claims. (Cl. 250—52)

The present invention relates in general to inspection apparatus, and has more particular reference to equipment for detecting variations in the density of objects or material under examination.

Apparatus embodying the present invention is particularly well adapted to detect slight density variations such as may be caused by voids within the body of the examined article, or by the presence of objects embedded or enveloped in the body of material under examination, where the constituent material of such embedded objects is of greater or lesser density than that of the body under examination.

An important object of the present invention is to provide inspection apparatus particularly well adapted for the detection of cavities or voids, or contaminant bodies, in explosive projectile loads; a further object being to provide improved means for inspecting loaded projectiles, whereby inspection may be accomplished merely by disposing and twirling the projectile in the path of an X-ray scanning beam; a still further object being to provide for relatively shifting the twirling projectile with respect to the scanning beam in the direction of the axis of twirling movement, to thereby accomplish the scanning of the object under inspection along a scanning path of helical configuration.

Another important object is to provide inspection equipment including means for passing X-rays through an inspection object and for detecting voids or opacities in the inspection object in terms of the intensity of X-rays transmitted therethrough; a further object being to provide sensitive equipment for relative density inspection by the progressive X-ray scanning of the inspection object, as by moving the object in the path of an X-ray scanning beam while detecting the relative intensity of X-rays transmitted through the object.

Another important object is to provide relative density inspection equipment comprising a suitable source of X-rays and sensitive X-ray detecting means spaced from the source and adapted to discriminate relatively small changes in the intensity of X-rays reaching the detection means, including mechanical equipment for relatively shifting the article or object being inspected transversely of the path of the X-ray beam, to thereby progressively scan the article.

Another important object is to provide apparatus for simultaneously scanning a plurality of articles of the character described at a plurality of scanning stations disposed radially of an X-ray source, such as the anode of an X-ray generating tube; a further object being to provide for successively shifting each inspection article into a plurality of inspection stations disposed radially of an X-ray source, including means for twirling and axially moving the inspection article at the several stations in order to successively scan adjacent zones of the inspection article at the several stations.

Another important object is to employ a suitable semiconductor material, such as the sulphide or selenide of cadmium or mercury, as an X-ray sensitive detector for determining slight changes in the intensity of X-rays impinging on the detector; a further object being to provide suitable translation means for indicating X-ray intensity changes in terms of variations in the electrical impedance of the sensitive material; a still further object being to utilize the X-ray responsive current carrying characteristics of the sensitive material for the determination of density differentials in the inspection object.

Briefly stated, in accordance with one aspect of the invention, a progressively turnable support frame may be mounted for turning movement about an X-ray source located at the turning axis of the frame, the source being adapted to project rays therefrom radially in all directions. Collimator means may be provided to define a plurality of angularly spaced apart scanning beams projected radially from the centrally located ray source, each through a corresponding circularly spaced scanning station, a ray sensitive detector being disposed in the path of each beam at said stations. A plurality of inspection object carriers may be supported in circularly spaced apart relationship in the turnable support frame, the spacement of said carriers corresponding with the spacement of inspection stations around the ray source, so that by progressively turning the support frame each of the carriers may be successively disposed at the inspection stations in alinement with the scanning beams. Means may be provided for rotating the carriers on the support frame whereby to twirl carrier supported objects in the inspection stations. Means may also be provided for supporting each carrier at a different elevation in the support frame and with respect to the ray source, as the carrier is positioned at successive inspection stations, whereby adjacent zones of inspection objects may be presented in the scanning beams at the several inspection stations and twirled in situ while being axially shifted, so that each successive zone of each inspection object may be successively scanned along a helical scanning path as an inspection article is passed successively through the several inspection stations.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 6 is a circuit diagram; and

Fig. 7 is a plan view of a transmission forming a part of the apparatus as shown in Fig. 1.

To illustrate the invention the drawings show an article or object 11 to be inspected for density variations. While the invention is not necessarily restricted to any particular kind of inspection object, the article 11, as shown, may comprise a container and its contents. Specifically, the drawings show a projectile, such as the explosive head of a rocket, comprising a case adapted to contain an explosive charge. In the manufacture of projectiles embodying explosive charges, it is desirable to be able to detect imperfections not only in the shell or container, but also in the explosive material with which the shell is loaded; and the present invention provides exceedingly efficient means for examining projectiles of the character mentioned for the purpose of detecting defects at the factory.

The invention, of course, is not necessarily limited to the examination of explosive projectiles. Indeed, its principles may be equally well applied to the detection of density variations in any X-ray translucent material, including metal articles, packaged food products, and numerous other manufactured items. In this connection, examined material, including the material of which the container is made, may be opaque, translucent, or transparent to visible light rays, the same, in the illustrated embodiment, comprising an outer container or shell S of metal, such as steel, having thickness of the order of ⅛ inch, a filling F of explosive, comprising in the illustrated embodiment a so-called "shaped" charge, and a metal charge shaping cone M, as of copper, having thickness of the order of ⅛ inch to define an inner conical configuration within the body of the explosive charge, as shown more particularly in Fig. 3 of the drawings. The outer shell or casing of the projectile shown in Fig. 3 may be formed with a conical nose portion N, a cylindrical side wall portion W, and an inwardly tapered trailing portion T terminating in a threaded collar C, by means of which the charged shell 11 may be secured upon a suitable tail structure to constitute the assembly as a rocket, the tail structure serving to guide and propel the rocket.

Figure 1:
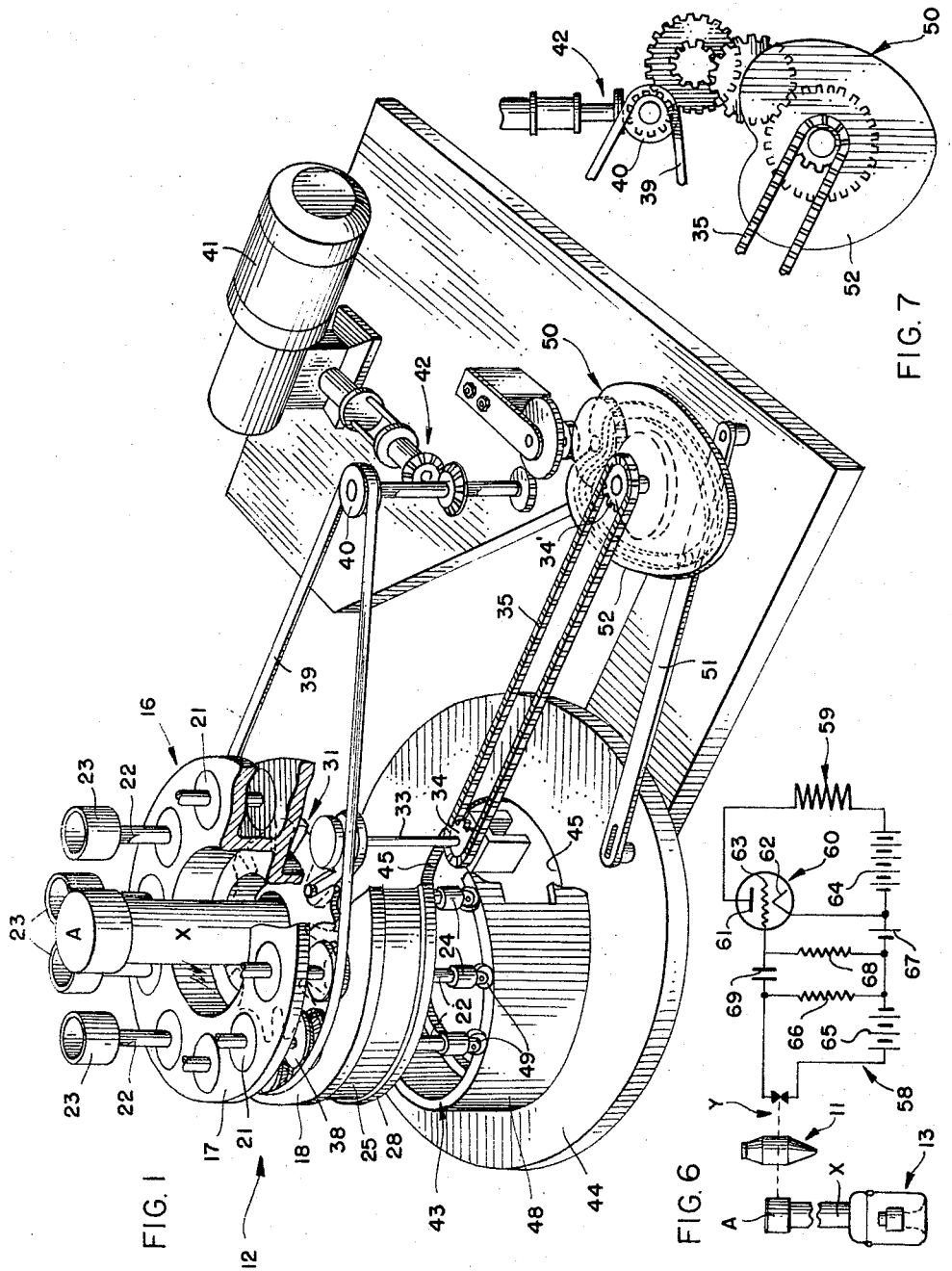
Fig. 1 is a diagrammatic view of inspection apparatus embodying the present invention.
Figure 2:
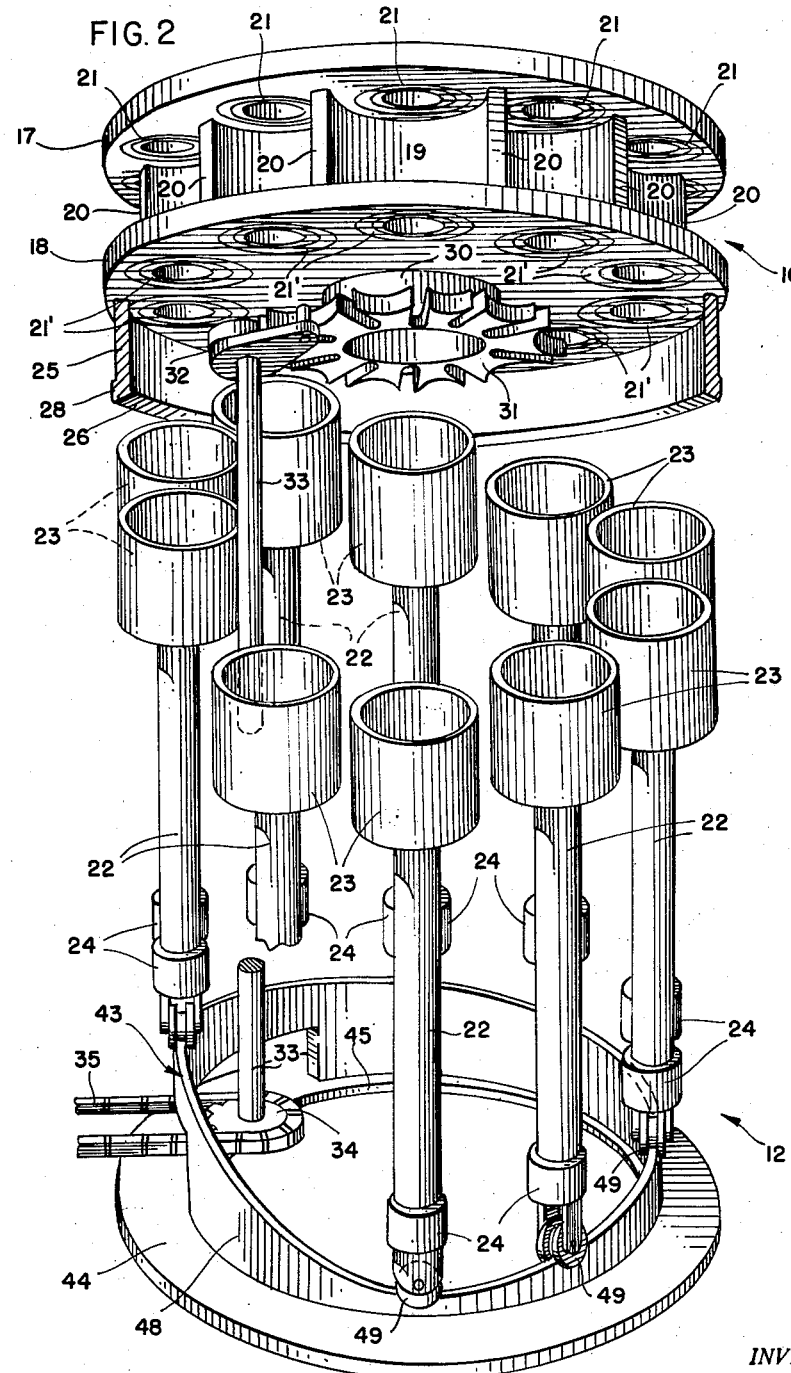
Fig. 2 is an exploded perspective view of parts of the apparatus shown in Fig. 1.
Figure 3:
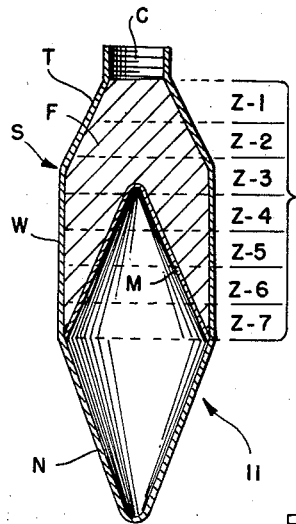
Fig. 3 is a sectional view taken through an inspection object of the sort adapted to be examined in the apparatus shown in Fig. 1.
Figure 4:
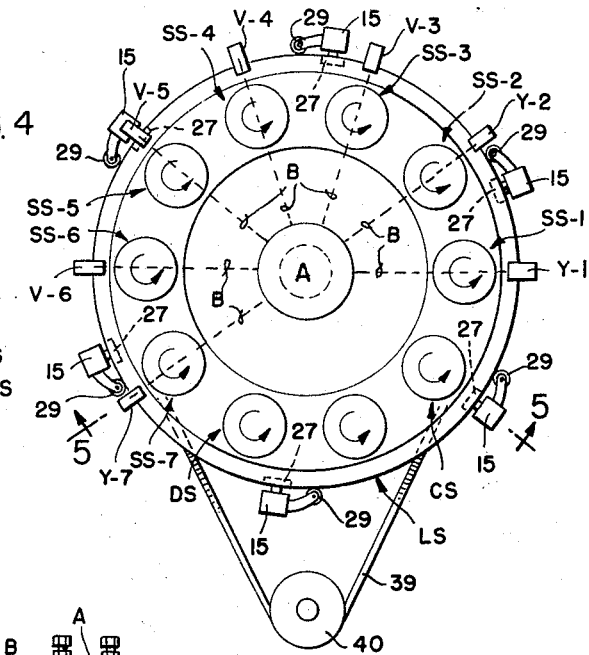
Fig. 4 is a top plan view of the apparatus shown in Fig. 1.

The present invention provides apparatus 12 operable to support articles of the type illustrated in Fig. 3 in position to be inspected by scanning the same in X-ray beams B emitted from a suitable source of X-rays and directed through examination objects upon ray sensitive detectors each disposed in the path of a corresponding scanning beam at a scanning station. The X-ray source may comprise a conventional X-ray generating tube 13 having a cathode D and a cooperating anode A enclosed within a sealed and evacuated envelope E. As shown, the ray generating tube 13 may be of the type wherein the anode is disposed at and within the end of a tubular envelope extension X, as of metal, in position to emit a plurality of X-ray scanning beams B of pencil-like character radially of said envelope extension, through suitable collimating means associated with the extension X, there being seven of such scanning beams and associated detectors Y-1, Y-2, Y-3, Y-4, Y-5, Y-6 and Y-7, forming circumferentially spaced scanning stations.

Since the envelope E of the X-ray tube commonly comprises fragile material, such as glass, it may be and preferably is enclosed in a suitable housing or tank H, as of heavy gauge sheet metal, to protect the fragile portions of the envelope E, said housing being rigidly connected with the envelope extension X as at the junction thereof with the tube envelope E. Any suitable or preferred means may be provided for supporting the X-ray generating tube and its housing in operative position, preferably with the envelope extension X projecting vertically upwardly of the remaining portions of the envelope E.

The apparatus 12 embodies means for supporting examination objects 11 in the path of the scanning beams B, for twirling and axially shifting the examination objects in the beams, and for moving each examination object successively into scanning position with respect to the several beams, and to support each examination object so that each beam will scan a different zone of the object. To these ends, the apparatus 12 comprises carriage means 14 supported on a framework 15, which may be conveniently erected upon the housing or casing H which encloses the envelope of the ray generating tube. The carriage means 14, as shown, may comprise a turnable carriage frame 16 of circular configuration, said carriage frame being supported upon the framework 15 for turning movement around the anode carrying envelope extension X. The carriage frame may comprise a pair of spaced apart upper and lower plate portions 17 and 18 secured in spaced relationship, as by means of an integral sleeve-like spacing portion 19 and circumferentially spaced ribs 20 integral with and extending radially outwardly of the portion 19 between the plate portions 17 and 18, said ribs 20 being preferably formed integral with said plates 17 and 18.

Between the ribs 20 and outwardly of the spacing portion 19 the plate portion 17 is provided with circularly spaced apart shaft bearings 21; and the plate portion 18 is likewise provided with circularly spaced shaft bearings 21' in alinement with the corresponding bearings 21, there being ten pairs of alined bearings 21 and 21' circularly spaced apart in the carriage frame 16 of the illustrated embodiment. Each pair of alined bearings 21 and 21' turnably supports a corresponding shaft 22. The several shafts 22 thus supported in the alined bearing pairs have ends extending upwardly of the plate portion 17, said upwardly extending shaft ends being formed with upwardly opening cups 23 secured on and in axial alinement with the cup carrying shafts 22, said cups being adapted to support examination objects in position to be scanned by the beams B. The shafts 22 also have lower ends extending beneath the plate portion 18, said lower ends being turnably journaled in roller step bearings contained in wheel carrying ferrules 24.

Means is provided for turnably supporting the carriage frame 16 in the framework 15, the carriage frame, to this end, being preferably provided with a dependent skirt portion 25 formed integrally on and at the peripheral edge of the plate portion 18 outwardly of the shaft bearings 21', said skirt portion providing a lower finished edge 26 adapted to engage and ride upon rollers 27 turnably supported upon the framework 15, in order to support the carriage frame 16 at a desired elevation in the structure, in position encircling the envelope extension X of the ray generating tube. The skirt portion 25 may also be formed circumferentially thereof with a cylindrical centering track 28 adapted to rollingly engage a plurality of circularly spaced guide rollers 29 mounted in the framework 15, to maintain the carriage frame in concentric alinement with respect to the axis of the anode carrying envelope extension X.

Means is provided for progressively turning the carriage frame 16 about the envelope extension X in order to position the shafts 22 and the carrying cups 23 successively at circularly spaced apart stations, including a loading station LS, a conditioning station CS, scanning stations SS–1, SS–2, SS–3, SS–4, SS–5, SS–6 and SS–7, each in alinement with a corresponding ray beam B, and a discharge station DS, there being in the illustrated embodiment a total of ten equally spaced apart stations to which the carriage frame may be turned. In order to thus progressively turn the carriage frame 16, the lower plate portion 18 may be formed centrally with a dependent collar portion 30, upon which may be secured the driven element 31 of a Geneva wheel driving mechanism, the driving element 32 of which is secured on a shaft 33 which is turnably journaled in the framework 15. Any suitable means, such as a driving sprocket 34 on the shaft 33 and a sprocket driving chain 35 drivingly associated with the sprocket 34, may be employed for actuating the Geneva wheel mechanism. The carriage frame 16 together with the shafts 22 and carrying cups 23, accordingly, may be progressively turned about the anode carrying envelope extension X of the ray generating tube in order to successively position examination objects 11 supported in the cups 23 in the scanning beams B.

In order to twirl the examination objects in the path of the beams B, means is provided for rotating the shafts 22 in the bearings 21 and 21', means being also provided for axially shifting the shafts 22 in order to shift the examination objects axially as the same are twirled in the path of the scanning beams. To these ends, the shafts 22 may be provided with spline grooves 36 and may be mounted for axial sliding movement in sleeves 37 journaled in the bearings 21 and 21' and fitted with driving pulleys 38, an endless driving belt 39 being drivingly engaged with the pulleys 38, except those associated with cup carrying shafts disposed at the loading and unloading stations. The belt 39 may be driven by a pulley 40 drivingly connected with a suitable motor 41, as through any suitable or preferred transmission means 42.

The motor 41 may serve as a source of driving power for the Geneva wheel mechanism, as by connecting the same with a sprocket 34' drivingly associated with the chain 35. Alternately, the Geneva wheel mechanism may be driven from a source of driving power other than the motor 41; in fact, any suitable or preferred means may be employed for progressively turning the carriage frame 16 through the Geneva wheel mechanism 31, 32.

As shown more particularly in Fig. 3 of the drawings, the present invention contemplates inspection of each examination object 11 by scanning successive zones of the object, such as the axially extending zones Z-1, Z-2, Z-3, Z-4, Z-5, Z-6 and Z-7, each zone being scanned at a corresponding one of the scanning stations SS-1, SS-2, SS-3, SS-4, SS-5, SS-6 and SS-7 of the inspection apparatus. Means is provided for shifting the examination object axially as the same is being scanned at each of the scanning stations in order to scan each zone along a helical scanning path, so that all portions of each zone may be closely scrutinized by a scanning beam. The present invention also provides means to present the examination object in such axially shifted position initially in each station so that the scanning of each zone may commence substantially in alinement with the terminal portions of an adjacent zone in registration with the portions of the examination object where the scanning of such adjacent portion terminates. Such arrangement assures that the examination object may be completely scanned in all portions of each of its several scanning zones.

The Geneva wheel mechanism, of course, determines the indexing movement of the carriage frame 16, each lobe of the wheel 31 defining a corresponding indexed position of the carriage frame. In order to axially shift examination objects at the several scanning stations, a circular cam 43 may be provided to axially shift the shafts 22 on which the examination objects are supported at the scanning stations, said cam comprising a support plate 44 of circular peripheral configuration and having a central opening 45 whereby the same may be turnably supported in the framework 15 in position encircling the envelope extension X of the X-ray tube, said plate being so turnably supported in any suitable or preferred fashion, as by means of circumferentially spaced rollers 46 carried on the framework 15 in position underlying the peripheral edge of the plate. The plate may be held in axial alinement with respect to the other structural components of the inspection apparatus, as by means of circumferentially spaced rollers 47 mounted on the framework 15 in position to rollingly engage the peripheral edge of the plate 44. The plate 44 carries a cylindrical cam forming member 48 secured thereto in coaxial alinement with the carriage frame 16, said cam forming member 48 having an upwardly facing edge disposed in position lying beneath and in alinement with the shafts 22, said edge being curved to form the shaft shifting cam 43.

Each of the ferrules 24, in which the shafts 22 are turnably journaled in step bearings, may be provided with grooved rollers 49 adapted to straddle and thus ridingly engage the cam forming edge of the cylindrical member 48; and means is provided for turning the shaft shifting cam structure from a retracted or starting position to a projected position during the interval while the carriage frame 16 remains stationary in each of its indexed positions, the shaft shifting cam structure being returned to its retracted position during the period when the carriage frame 16 is advanced from one indexed position to its next adjacent indexed position. The cam 43 is configurated so that, in turning from retracted to projected position, each of the shafts 22 will be axially shifted through a displacement corresponding with the width of the examination zones. Accordingly, each of the several examination objects disposed in the several examination zones will be moved in desired fashion in the path of a scanning beam B as the object is twirled in place in the examination zone. By returning the cam structure to retracted or starting position as the carriage frame 16 is advanced from one indexed position to another, it will be seen that each object supporting shaft 22 will occupy the same axially shifted position with respect to the carriage frame during indexing movement of the frame, whereby the initial scanning position of each shaft 22 and the examination object carried thereby at each successive scanning station will be the same as the final scanning position occupied thereby at a preceding scanning station.

Intermittent cam driving means 50 may be provided for projecting and retracting the shaft shifting cam structure in desired fashion, such driving means 50 being preferably actuated in timed relation with the operation of the carriage frame driving mechanism. As shown, the driving means 50 comprises an actuating arm 51 connected with the shaft shifting cam structure and an arm driving cam 52 driven in common with the chain driving sprocket 34'.

Figure 5:
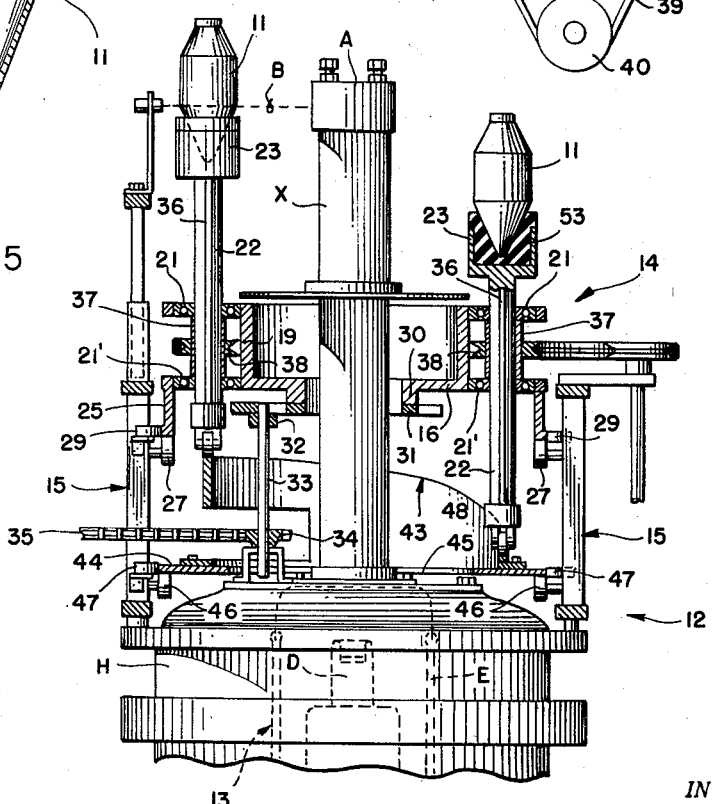
Fig. 5 is a sectional view taken substantially along the line 5—5 in Fig. 4.

It will be seen that the examination object support shafts 22 will be drivingly disconnected from the belt 39 when in the discharge and loading stations DS and LS. Any suitable handling mechanism may be provided for applying examination objects in the supporting cups 23 as the same successively occupy the loading station LS. As shown more particularly in Fig. 5 of the drawings, each cup 23 may be fitted with an insert 53 shaped to receive and firmly support an examination object, the insert 53 preferably comprising a body of rubber-like material shaped to snugly fit the cups 23 and formed, in the illustrated embodiment, with an upwardly opening, conical cavity adapted to snugly and frictionally receive the nose portion N of the examination object comprising an explosive rocket head.

It will also be apparent that the sensitive detectors Y-1, Y-2, Y-3, Y-4, Y-5, Y-6 and Y-7 will each be irradiated by the corresponding pencil-like X-ray beams only after the same have passed through the articles being inspected. The intensity of X-rays thus applied upon the inspection objects will depend upon the X-ray absorptive character of the material through which the ray beam shall have passed in reaching a detector. If a beam be transmitted through a portion of the examination object containing a void or cavity, the intensity of rays impinging upon the detector will be relatively higher than where the beam traverses voidless portions of the examination object. Conversely, the intensity of rays impinging on a detector after passing through portions of the examination object containing impurities or embedded foreign objects will be relatively lower than where the beam traverses uncontaminated portions of the examination object, provided, of course, that such impurities or embedded objects be of greater X-ray opacity than the material of the examination object. Where impurities are of lesser X-ray opacity than the material of the examination object, the X-ray beam impinging on the detector will, of course, be of relatively greater intensity than where it traverses portions of the article that are free of relatively transparent impurities or voids.

The X-ray sensitive detector elements Y-1, Y-2, Y-3, Y-4, Y-5, Y-6 and Y-7 preferably each comprise crystalline, ray sensitive semi-conductor material, such as the sulphides or selenides of cadmium and mercury. The electrical characteristics of the named materials are such that the impedance thereof progressively declines or becomes reduced in proportion to the intensity of X-rays impinging thereon and, as more fully explained in copending applications for U.S. Letters Patent, Serial No. 190,801, filed October 18, 1950, Serial No. 232,073, filed June 18, 1951, and Serial No. 441,873, filed July 7, 1954, now Patents Nos. 2,706,790, 2,706,791, and 2,706,792 the intensity of impinging X-rays may be accurately measured in terms of the apparent impedance of the sensitive semiconductor material forming the detectors Y-1, Y-2, Y-3, Y-4, Y-5, Y-6 and Y-7.

Any suitable or preferred means may be employed for determining the impedance of the several detectors. As shown more particularly in Fig. 6 of the drawings, each of the detectors may be connected with a corresponding electronic translation system 58 adapted to actuate a suitable load device 59, which may serve to operate any desired type of indicating or recording equipment, or other mechanism which it may be desired to operate, in accordance with density variations in the examination object as measured by the ray sensitive detector. The translation system 58 may comprise an electron flow amplifier 60 having an anode 61, an electron emitting cathode 62, and a flow regulating grid 63, the anode 61 and the cathode 62 being interconnected in an output circuit including a suitable power source 64 and the load device 59 to be operated. The control grid 63 may be interconnected with a grid control circuit in which the sensitive detector element is also operatively connected, whereby to electrically energize the grid 63 for the control of the output circuit of the tube, in accordance with the transitory impedance value of the detector. To this end, the grid control circiut may comprise the ray sensitive detector, a preferably unidirectional power source 65, and a ballast or control resistor 66, interconnected in series so that electrical potential corresponding with the impedance value of the detector may be developed at the resistor 66, as at the opposite ends thereof, for application between the cathode 62 and the control grid 63 of the amplifier 60. In order to thus control the grid 63, the cathode 62 may be connected with one end of the resistor 66, as through a source of grid biasing power 67. The other end of the resistor may be connected with the grid 63 through a condenser 69, in order to operate the amplifier 60 only in response to the fluctuating component of crystal current in the grid control circuit, biasing power from the source 67 being applied on the grid 63 through a resistor 68.

Any substantial variation in the impedance of the detector will indicate an imperfection in the article being inspected; and by moving and scanning the article during the inspectional process, in the manner heretofore described, the exact size, location and general nature of the imperfection may be accurately determined, in the scanned portions of the examination object. Voids or cavities in the inspected article, or the presence of impurities of greater X-ray transparency than the material of the examined article, will be shown by decrease in the measured impedance of the detector, that is to say, by increase in current flow therethrough. The presence of foreign material in the examination object, if such material be relatively less transparent to X-rays than the material of the examination object, will be revealed by an increase in the measured impedance value of the detector element, that is to say, by decrease in current flow therethrough.

Any suitable or preferred indicating, recording, marking or reject equipment may be actuated in response to measured changes in the impedance of the detectors, as disclosed, for example, in the copending application of John E. Jacobs and John F. Howell for U.S. Letters Patent on Translation System, Serial No. 499,304, filed April 5, 1955. In that connection, the load device 59 may comprise the operating coil of a relay controllingly connected with reject apparatus, such as paint spraying equipment, disposed, as at an examination station, in position to apply paint as a reject marking whenever the load device 59 is actuated in response to a defect in the examination object being scanned at the station, as measured in terms of variation of predetermined extent in the impedance of the detector element at the scanning station. Alternately, graphical charts showing the impedance variation of all of the detectors may be made and preserved in order to form a precise visual record of the inspected condition of examined objects.

In order to prevent spurious operation of indicating, recording, marking, or reject equipment driven or otherwise controlled by the translation system 58, during indexing movement of the frame 16, a disabling switch may be operatively associated with the system 58, or in any device operating circuit controlled by the load device 59 when constituted as a relay, and means may be provided for actuating the disabling switch, as under the control of a switch actuating cam driven with the Geneva wheel actuating transmission, to thereby prevent spurious operation of the inspection apparatus during indexing movement of the frame 16.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Inspection apparatus comprising the combination, with a source of penetrating rays and a ray sensitive detector disposed in the path of a ray beam emanating from said source, of carrier means for moving an examination object into and out of and for supporting the same in the path of said beam, means for twirling said object about an axis of rotation while the same is disposed in the path of said beam and means to move the object in the direction of its axis of rotation, while it is twirling, so that the ray beam may scan the object along a helical path.

2. Inspection apparatus comprising the combination, with a source of penetrating rays and a ray sensitive detector disposed in the path of a ray beam emanating from said source, of a carrier for supporting an examination object in the path of said beam, means to rotate the carrier to twirl the object in the beam, means to shift the carrier in the direction of its axis of rotation to correspondingly move the examination object in the beam transversely thereof, so that the ray beam may scan the object along a helical path, and means to shift the carrier bodily to move the examination object into and out of the path of the beam.

3. Inspection apparatus comprising the combination, with a source of penetrating rays and a ray sensitive detector disposed in the path of a ray beam emanating from said source, of a frame, an examination object carrier on said frame, means for shifting said frame and carrier to move a carrier supported examination object into and out of the path of said beam, means to rotate the carrier on the frame to twirl the supported object in the path of said beam, and cam means operable to shift said carrier on the frame in the direction of the axis of twirling movement of the carrier supported object.

4. Inspection apparatus comprising the combination, with a source of penetrating rays and a ray sensitive detector disposed in the path of a ray beam emanating from said source, of a support frame, a shaft mounted in the frame and formed as a carrier for an examination object, a belt driven pulley for turning said shaft in the frame to rotate a carrier mounted examination object in the path of said beam, means for axially shifting said shaft in said frame to move such carrier mounted examination object in the beam in the direction of its axis of rotation, and means to move the frame and shaft to shift such object into and out of the beam.

5. Inspection apparatus comprising the combination, with a source of penetrating rays and a plurality of circularly spaced ray sensitive detectors disposed at scanning stations in the path of ray beams emanating from said source, of a support frame encircling said source, a plurality of carriers circularly spaced on said frame for receiving and supporting each an examination object on said frame in position to be disposed in said ray beams at said scanning stations, means to indexingly turn said frame to present said carriers and objects supported thereon successively at said stations, means for turning said carriers on said frame to twirl carrier supported examination objects in the paths of said beams, and means operable to move said carriers in the direction of the axes of turning movement thereof to shift carrier supported examination objects transversely in the paths of said ray beams as the objects twirl therein, so that said beams may scan the objects along helical paths.

6. Inspection apparatus comprising the combination, with a source of penetrating rays and a plurality of circularly spaced ray sensitive detectors disposed at scanning stations in the path of ray beams emanating from said source, of a support frame encircling said source, a plurality of carriers circularly spaced on said frame for receiving and supporting each an examination object on said frame in position to be disposed in said ray beams at said scanning stations, means to indexingly turn said frame to present said carriers and objects supported thereon successively at said stations, said carriers comprising shafts supported for rotary and axial movement in said frame and formed at the upper ends thereof each with means for mounting an examination object thereon, a shaft supporting and shifting cam comprising means forming a circular track underlying the lower ends of said shafts, said cam being shaped to support the shafts in position presenting shaft mounted objects at progressively increasing elevation at successive stations, and means to relatively turn the track with respect to the frame to axially shift the shafts on the frame at said stations.

7. Inspection apparatus comprising the combination, with a source of penetrating rays and a plurality of circularly spaced ray sensitive detectors disposed at scanning stations in the path of ray beams emanating from said source, of a support frame encircling said source, a plurality of carriers circularly spaced on said frame for receiving and supporting each an examination object on said frame in position to be disposed in said ray beams at said scanning stations, means to indexingly turn said frame to present said carriers and objects supported thereon successively at said stations, said carriers comprising shafts supported for rotary and axial movement in said frame and formed at the upper ends thereof each with means for mounting an examination object thereon, a shaft shifting cam comprising means forming a circular track underlying the lower ends of said shafts, means to relatively turn the track with respect to the frame to axially shift the shafts on the frame, and means for turning said carriers on said frame to twirl carrier supported examination objects in the paths of said beams.

8. Inspection apparatus comprising the combination, with a source of penetrating rays and a plurality of circularly spaced ray sensitive detectors disposed at scanning stations in the path of ray beams emanating from said source, of a support frame encircling said source, a plurality of carriers circularly spaced on said frame for receiving and supporting each an examination object on said frame in position to be disposed in said ray beams at said scanning stations, means to indexingly turn said frame to present said carriers and objects supported thereon successively at said stations, said carriers comprising shafts supported for rotary and axial movement in said frame and formed at the upper ends thereof each with means for mounting an examination object thereon, means for turning said carriers on said frame to twirl carrier mounted examination objects in the paths of said beams, a shaft shifting cam comprising means forming a circular track underlying the lower ends of said shafts, and means to relatively turn the track with respect to the frame, in one direction, to axially shift the shafts on the frame while the frame is stationary in any indexed position, and to turn the track, in the opposite direction, with the frame to support the shafts against axial movement thereon, during indexing movement of the frame from one indexed position to another.

References Cited in the file of this patent

UNITED STATES PATENTS

| 1,300,274 | Jeffries et al. | Apr. 15, 1919 |
| 2,132,447 | Stout | Oct. 11, 1938 |
| 2,352,091 | Fedorchak et al. | June 20, 1944 |
| 2,370,163 | Hare | Feb. 27, 1945 |
| 2,713,125 | Geisler et al. | July 12, 1955 |
| 2,761,068 | Geisler | Aug. 28, 1956 |

OTHER REFERENCES

The Photo-Conductivity of "Incomplete Phosphors," Frerichs, Physical Review, vol. 72, No. 7, October 1, 1947, pp. 594–601.